3,308,022
NOVEL HYPOTENSIVE COMPOSITIONS CONTAINING 1-SUBSTITUTED-3-CYANO GUANIDINES
John Rhodes Cummings, Suffern, and Elliott Cohen, Pearl River, N.Y., assignors to American Cyanamid Company, Stamford, Conn., a corporation of Maine
No Drawing. Filed June 25, 1964, Ser. No. 378,038
6 Claims. (Cl. 167—65)

This application is a continuation-in-part of our copending application Serial No. 236,133, filed November 7, 1962, and now abandoned.

This invention relates to new compositions of matter for lowering elevated blood pressure. More particularly, it relates to therapeutic compositions containing 1-substituted-3-cyanoguanidines which operate to reduce elevated blood pressure in mammals. The invention includes the new compositions of matter and methods of lowering elevated blood pressure therewith.

Our invention is based upon the discovery that certain 1-substituted-3-cyanoguanidines are potent hypotensive agents. The action of these 1-substituted-3-cyanoguanidines is that of long lasting vasodilation, rather than that of adrenergic or ganglionic blockade. The 1-substituted-3-cyanoguanidines of the present invention may be represented by the following general formula:

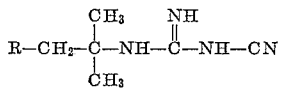

wherein R is hydrogen or a lower alkyl group having from 1 to 3 carbon atoms. The 1-substituted-3-cyanoguanidines, the active ingredients of the novel compositions of the present invention, have not as yet been demonstrated to be useful in human therapy.

The 1-substituted-3-cyanoguanidines, the active ingredients of the novel compositions of the present invention, may be readily prepared by the interaction of an amine such as, for example, t-butylamine, t-amylamine, t-hexylamine, 2-amino-2,4-dimethylpentane, etc., with sodium dicyanamide in a lower alkanol solvent in the presence of a mineral acid. Suitable lower alkanol solvents are, for example, isopropanol, n-butanol, and the like. Suitable mineral acids are sulfuric acid, phosphoric acid, etc. The reaction is generally carried out at steam bath temperatures over a period of time of from 15 minutes to a dozen hours or more. The resultant 1-substituted-3-cyanoguanidine may be isolated by procedures well-known to those skilled in the art.

The method of administering the 1-substituted-3-cyanoguanidines of the present invention is limited to oral administration. They may be orally administered, for example, with an inert diluent or with an assimiliable edible carrier, or they may be enclosed in hard or soft gelatin capsules, or they may be compressed into tablets, or they may be incorporated directly with the food of the diet. It is an advantage of the present invention that the 1-substituted-3-cyanoguanidines may be orally administered in any convenient manner.

The amount of a single dose or of a daily dose to be given will vary, but should be such as to give a proportionate dosage of from about 5 mg. to about 25 mg. per kg. of body weight per day. In terms of total weight of active ingredient, this is usually from about 0.2 g. to about 2.0 g. per daily dosage. This dosage regimen may be adjusted to provide the optimum therapeutic response; for example, several divided doses may be administered daily or the dose may be proportionately reduced as indicated by the exigencies of the therapeutic situation. As indicated previously in one embodiment of our invention, it is preferred to incorporate the 1-substituted-3-cyanoguanidines directly in the food of the diet. Any suitable method for dispersing the active ingredient uniformly throughout the food can be used. The amount of active ingredient added to the diet may be varied, but it is ordinarily found that an amount of 1-substituted-3-cyanoguanidine within the range of from about 0.2 g. to about 2.0 g. per kilogram of diet promotes the maximum lowering of vascular blood pressure.

For therapeutic administration, the active compounds of this invention may be incorporated with excipients and used, for example, in the form of tablets, troches, capsules, elixirs, suspensions, syrups, wafers, chewing gum and the like. Such compounds and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that a dosage unit form contains between about 10 and 200 milligrams of active compound.

The tablets, troches, pills, capsules and the like may contain the following: a binder such as gum tragacanth, acacia, corn starch, or gelatin; a disintegrating agent such as a corn starch, potato starch, alginic acid and the like; a lubricant such as magnesium stearate; and a sweetening agent such as sucrose or saccarin may be added or a flavoring agent such as peppermint, oil of wintergreen or cherry flavoring. A syrup or elixir may contain the active compounds, sucrose as a sweeting agent, methyl and propyl parabens as preservatives, a dye and a flavoring such as cherry or orange flavor.

The following examples illustrate the preparation and hypotensive effect of the novel compositions of the present invention and the method of administering them.

EXAMPLE 1

*1-t-butyl-3-cyanoguanidine*

A solution of 111 g. of t-butylamine hydrochloride and 90 g. of sodium dicyanamide in 600 ml. of butanol is refluxed for 24 hours. Filtration, followed by evaporation of the filtrate in vacuo gives the product which is crystallized from aqueous ethanol as waxy crystals, M.P. 188–189° C. (dec.).

EXAMPLE 2

*1-t-amyl-3-cyanoguanidine*

In 125 ml. of butanol is dissolved 19.2 g. of tertiary amylamine. To this is added 5.85 ml. of sulfuric acid and 2.5 ml. of water. The white solid which precipitates upon the addition of the sulfuric acid dissolves when the flask is swirled. This solution is then concentrated to ½ its volume and 24.0 g. of sodium dicyanamide is then added. The mixture is heated over steam for ½ hour at which time the pH of the mixture is 7.8–8.2. The mixture is then heated over steam overnight, about 17 hours. The resultant white solid is then filtered off and washed with ethanol. The filtrate is then evaporated to near dryness and the residue is triturated with 155 ml. of water and cooled. The white solid is filtered off, and washed thoroughly with water; M.P. 155.5–157° C.

EXAMPLE 3

*Hypotensive and anti-angiotensin activities of t-butyl-dicyandiamide and t-amyldicyandiamide in normotensive rats*

Conscious male albino Sherman strain rats were fastened to rat boards in a supine position by means of canvas vests and limb ties. The femoral areas were anesthetized by subcutaneous infiltration of lidocaine. The left or right common iliac arteries were exposed and clamped off proximally by an artery clamp and distally with thread. Incisions were made near the tie and short nylon catheters were inserted and tied in place. The other end of the catheters were fitted with 24 gauge hubless needles attached to thick-walled polyethylene tubes. The cyanoguanidines were administered to the animals orally by stomach tube. The compounds were suspended in 2% aqueous starch solution at a concentration such that 1 ml. per 100 g. of body weight gave the animal the desired dose. Volume was usually 2 ml. since the rats average 200 g. The vasopressor agents, angiotensin and epinephrine, were injected into the femoral vein. Mean arterial blood pressure was measured 2 hours after administration of the compounds. Blood pressure measurements were made with four Statham P23 Db strain gauges attached to a Sanborn Polyviso Recorder. The recorder is equipped with four strain gauge preamplifiers with averaging circuits for measuring mean arterial pressure. Table I summarizes the effects on mean blood pressure (MBP) and on the vasopressor response to intravenous injections of angiotensin (angio), 0.25 mcg./kg., two hours after administering t-butyldicyandiamide and t-amyldicyandiamide to a series of rats. The tabulation shows the maximum rise in MBP produced by the two pressor agents. Under the conditions of this experiment, the two cyanoguanidines demonstrated hypotensive and antiangiotensin activity. Responses to epinephrine was essentially unaltered.

TABLE I

| Treatment | Oral Dose, mg./kg. | No. of Rats | Cardiovascular Effects 2 Hrs. after Treatment | | |
|---|---|---|---|---|---|
| | | | MBP,[1] mm. Hg | Angio hypertension, mm. Hg | Epi hypertension, mm. Hg |
| Controls | | 50 | 113±5 | 33±10 | 39±6 |
| t-butyldicyandiamide | 100 | 5 | 82±7 | 11±2 | 30±10 |
| t-Amyldicyandiamide | 100 | 6 | 75±12 | 5±3 | 39±8 |
| | 10 | 4 | 102±7 | 10±2 | 49±6 |

[1] Data expressed as the mean ± the standard deviation.

EXAMPLE 4

*Antihypertensive activities of t-butyldicyandiamide and t-amyldicyandiamide in conscious, hypertensive dogs*

Renal hypertension was produced in dogs by renal artery constriction with a Goldblatt clamp. A persistent elevation in blood pressure ensued as a consequence of kidney ischemia. Prior to constricting the renal artery, the mean blood pressure of one of the hypertensive animals, Dog 863, was 109 mm. Hg as determined directly by means of a Statham pressure transducer-Sanborn recorder system. Several months postoperatively, the animal's mean blood pressure was elevated to 157 mm. Hg. Five minutes after this reading, the dog was given t-butyldicyandiamide, 25 mg./kg. orally. After dosage, the mean blood pressure values at different time periods were as follows: 70 minutes, 148 mm. Hg; 130 minutes, 125 mm. Hg; 185 minutes, 125 mm. Hg; 250 minutes, 120 mm. Hg. In another study with hypertensive Dog 863, mean blood pressure was 158 m. Hg prior to dosage. The animal was then given t-amyldicyandiamide, 25 mg./kg. orally. The mean blood pressure values at intervals after dosing were as follows: 105 minutes, 172 mm. Hg; 224 minutes, 135 mm. Hg; 332 minutes, 125 mm. Hg; 1384 minutes, 155 mm. Hg.

EXAMPLE 5

*Action of t-amyldicyandiamide on arterial blood pressure and flow in an anesthetized, normotensive dog*

The effect of t-amyldicyandiamide on peripheral vascular resistance and arterial pressure was studied in dogs anesthetized with pentobarbital. Using a retroperitoneal approach, the abdominal aorta was exposed and ligated. Blood was led from a cannula in the aorta proximal to the tie through a Sigmamotor pump to a cannula in the distal section of the divided vessel. The outflow of the pump was adjusted so that the perfusion pressure in the hindquarters was approximately equal to the systemic pressure. Any change in perfusion pressure thereafter represented a corresponding change in vascular resistance since blood flow through the bed was kept constant. Perfusion and arterial pressures were measured with pressure transducers attached to a polygraph. In Table II, the typical effects of t-amyldicyandiamide, 5 mg./kg. intraperitoneally, on the arterial and perfusion pressures of a dog are tabulated. The data indicate that the drug-induced hypotension was related to a decrease in peripheral vascular resistance.

TABLE II

| Minutes after t-amyldicyandiamide, 10 mg./kg. I.P. | Percent change from the control | |
|---|---|---|
| | Perfusion pressure | Systolic blood pressure |
| 30 | −39 | −40 |
| 90 | −42 | −35 |
| 120 | −45 | −44 |

EXAMPLE 6

*Hypotensive and cardiovascular actions and various pressor responses of t-amyldicyandiamide in rats and dogs*

In these measurements substantially the same procedures were used as described in Example 3. Male albino rats of the Wistar strain weighing between 200 and 300 grams were fastened to rat boards in supine positions by means of canvas vests and limb ties. After producing local anesthesia with lidocaine, the animals' femoral arteries were exposed and catheterized. Measurements were made before and after oral administration of t-amylidcyandiamide of the vasopressor responses to intravenously administered epinephrine hydrochloride (2 micrograms per kilogram of body weight), norepinephrine hydrochloride (2 micrograms per kilogram of body weight), angiotensin amide (0.25 microgram per kilogram of body weight), vasopressin (10 micrograms per kilogram of body weight), phenethylamine hydrochloride (1 milligram per kilogram of body weight), and barium chloride (2 milligrams per kilogram of body weight). Antiotensin—also known as angiotonin and hypertensin—is a pressor substance liberated from plasma globulins by kidney extracts. Vasopressin is an antidiuretic hormone and a vasopressor. Epinephrine, norepinephrine, phenethylamine, and barium chloride are also known to produce pressor effects. The vasomotor responses of rats tilted upward at a 75° angle were also noted and recorded.

Additional measurements were made of the action of t-amyldicyandiamide on the cardiovascular and autonomic nervous system in mongrel dogs. Hypertension of renal origin was produced in dogs by constricting the renal artery with a silver clamp according to the method described by Goldblatt, et al., J. Exper. Med. 59, 347 (1934). Persistent elevation of blood pressure results as a consequence of kidney ischemia. Dogs having unusually high normal blood pressures were selected, and further elevation was induced by unilateral renal arterial constriction by means of the Goldblatt clamp. By use of this technique, marked and sustained hypertension usually developed. Neurogenic hypertension was produced in dogs by means of a Goldblatt clamp applied to the common carotid artery in the region of the carotid sinus.

The effects of t-amyldicyandiamide on the mean arterial blood pressures and heart rates of conscious rats two hours after oral doses of 10 to 200 milligrams per kilogram of body weight are summarized immediately below in Table III.

TABLE III

[Effects of t-amyldicyandiamide upon the blood pressure and heart rate of conscious rats two hours after oral dosing [1]]

| Treatment | Oral Dose, mg./kg. | No. Rats | Mean Arterial Pressure, mm. Hg | Heart Rate, beats/min. |
|---|---|---|---|---|
| Controls | 0 | 80 | 116±9 | 450±15 |
| t-amyldicyandiamide | 10 | 8 | 105±7 | 460±15 |
| Do | 25 | 8 | 94±10 | 425±10 |
| Do | 50 | 6 | 78±10 | 400±20 |
| Do | 100 | 10 | 72±11 | 360±20 |
| Do | 200 | 6 | 60±6 | 340±15 |

[1] Data expressed as the average ± the standard deviation.

Responses to various pressor agents before and two hours after administering t-amyldicyandiamide to conscious rats are summarized immediately below in Table IV:

TABLE IV

[Various pressor responses before and two hours after administering an oral dose of t-amyldicyandiamide to conscious rats [1]]

| Pressor Agent/ or Stimulus | I.V. Dose, mcg./kg. | No. Rats | Rise in Systolic Blood Pressure mm. Hg | |
|---|---|---|---|---|
| | | | Control Reponse | After t-amyldicyandiamide, 50 mg./kg. |
| Epinephrine | 2 | 8 | 48±12 | 39±6 |
| Norepinephrine | 2 | 4 | 51±10 | 32±9 |
| Vertical tilt | | 8 | 18±5 | 15±5 |
| Angiotensin | 0.25 | 8 | 41±14 | 3±3 |
| Phenethylamine | 1,000 | 4 | 45±12 | 11±4 |
| Vasopressin | 10 | 4 | 48±9 | 12±6 |
| Barium chloride | 2,000 | 4 | 53±7 | 22±7 |

[1] Data expressed as the average ± the standard deviation.

The degree and duration of hypotension in normotensive and renal or neurogenic hypertensive conscious dogs following oral doses of 10, 25, and 100 milligrams per kilogram of body weight of t-amyldicyandiamide are summarized immediately below in Table V:

TABLE V
[Effect of t-amyldicyandiamide on the blood pressure and heart rate of conscious normotensive and hypertensive dogs]

| Dog No. | Oral Dose, mg./kg. | Mean Blood Pressure, mm. Hg, After Treatment | | | | | Heart Rate, beats/min., After Treatment | | | | |
|---|---|---|---|---|---|---|---|---|---|---|---|
| | | Control | 2 hrs. | 4 hrs. | 6 hrs. | 24 hrs. | Control | 2 hrs. | 4 hrs. | 6 hrs. | 24 hrs. |
| 859 | 10 | 120 | 110 | 125 | | | 120 | 180 | 130 | | |
| 860 | 10 | 115 | 107 | 103 | 105 | | 75 | 60 | 105 | 70 | |
| 860 | 10 | 90 | 99 | 93 | | | 72 | 110 | 78 | | |
| 863 [1] | 10 | 160 | 150 | 145 | 160 | | 120 | 120 | 108 | 114 | |
| 864 [1] | 10 | 150 | 155 | 160 | 165 | | 72 | | 90 | 84 | |
| 861 | 25 | 125 | 95 | 80 | 100 | 125 | 90 | 190 | 200 | 160 | 80 |
| 862 | 25 | 125 | 73 | 90 | 80 | 117 | 95 | 200 | 145 | 170 | 75 |
| 950 | 25 | 123 | 112 | 98 | 110 | | 114 | 142 | 116 | 96 | |
| 863 [1] | 25 | 158 | 172 | 130 | 125 | 155 | 95 | 110 | 160 | 155 | 115 |
| 864 [1] | 25 | 180 | 172 | 158 | 175 | 175 | 75 | 85 | 95 | 95 | 95 |
| 863 [1] | 25 | 168 | 113 | 123 | 150 | | 116 | 140 | 180 | 150 | |
| 870 [2] | 25 | 135 | 110 | 120 | 125 | 133 | 125 | 190 | 155 | 130 | 115 |
| 950 [2] | 25 | 138 | 100 | 125 | 120 | 142 | 128 | 245 | 195 | 120 | 120 |
| 898 [2] | 25 | 130 | 118 | 116 | 125 | 120 | 126 | 144 | 112 | 114 | 85 |
| 860 | 100 | 95 | 60 | 50 | 50 | 112 | 85 | 165 | 155 | 155 | 135 |

[1] Dogs 863, 864; renal hypertensive animals.
[2] Dogs 870, 898, 950; neurogenic hypertensive animals.

What is claimed is:

1. A therapeutic composition in oral dosage unit form useful for lowering elevated blood pressure comprising from 0.2 gram to 2.0 grams per daily dosage unit of a compound of the formula:

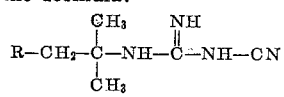

wherein R is selected from the group consisting of hydrogen and lower alkyl of from 1 to 3 carbon atoms, and an edible carrier.

2. A therapeutic composition in oral dosage unit form useful for lowering elevated blood pressure comprising from 0.2 gram to 2.0 grams per daily dosage unit of 1-t-butyl-3-cyanoguanidine, and an edible carrier.

3. A therapeutic composition in oral dosage unit form useful for lowering elevated blood pressure comprising from 0.2 gram to 2.0 grams per daily dosage unit of 1-t-amyl-3-cyanoguanidine, and an edible carrier.

4. The method of lowering elevated blood pressure which comprises administering orally to a mammal an amount ranging from 5 mg. to 25 mg. per kilogram of body weight per day of a compound of the formula:

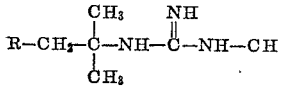

wherein R is selected from the group consisting of hydrogen and lower alkyl of from 1 to 3 carbon atoms.

5. The method of lowering elevated blood pressure which comprises administering orally to a mammal an amount ranging from 5 mg. to 25 mg. per kilogram of body weight per day of 1-t-butyl-3-cyanoguanidine.

6. The method of lowering elevated blood pressure which comprises administering orally to a mammal an amount ranging from 5 mg. to 25 mg. per kilogram of body weight per day of 1-t-amyl-3-cyanoguanidine.

References Cited by the Examiner

Shapiro et al.: Chemical Abstracts, vol. 54, cols. 3194–3195; Abstracting Journal of the American Chemical Society, vol. 81, pp. 4635–4639, 1959.

ALBERT T. MEYERS, Primary Examiner.

JULIAN S. LEVITT, Examiner.

LEROY B. RANDALL, Assistant Examiner.